Aug. 27, 1957  L. B. NEIGHBOUR ET AL  2,804,308
CONVERTIBLE GROUND OR POWER DRIVE FOR MATERIAL SPREADER
Filed April 30, 1954  2 Sheets-Sheet 1

INVENTORS
L. B. NEIGHBOUR
M. J. MARTENS
BY
C. T. Parker
ATTORNEY

INVENTORS
L. B. NEIGHBOUR
M. J. MARTENS
BY
ATTORNEY

United States Patent Office 2,804,308
Patented Aug. 27, 1957

2,804,308

CONVERTIBLE GROUND OR POWER DRIVE FOR MATERIAL SPREADER

Leonard B. Neighbour, Moline, and Maurice J. Martens, East Moline, Ill., assignors to Deere & Company, Moline, Ill., a corporation of Illinois Application April 30, 1954, Serial No. 426,784

11 Claims. (Cl. 275—5)

This invention relates to a material spreader and more particularly to improved driving mechanism therefor.

The conventional material spreader used on farms for spreading manure, other fertilizer, and similar materials comprises a ground-wheel-supported body drawn over the field by a tractor or equivalent vehicle and having an unloading device in the form of an endless conveyor or apron driven by step-by-step means to discharge the load in increments at the rear end of the body. Other discharge devices associated with the apron serve to scatter the discharged material over a relatively wide area. Spreaders of the general character referred to are of two general types, depending upon the type of drive mechanism for the apron and other discharge device, commonly known as a beater. In some spreaders, the apron or conveyor is driven directly from an eccentric or equivalent means powered by one of the ground wheels, the beater and allied discharging devices being power driven from the power take-off shaft of the propelling tractor. In other types, all of the movable parts are power driven.

There are, here as in other instances, two schools of thought as to whether the apron should be power or ground-wheel driven. Each design has its own advantages and disadvantages and the pro and con vary somewhat according to different circumstances. It is commonly accepted that the ground-wheel drive is preferable under ideal circumstances, because the rate of feed is directly proportioned to the travel of the spreader over the ground. However, when the ground is slippery or otherwise unsuitable for uniform traction, the rate of feed will vary. In cases like this, the power drive may have some advantages. One particular disadvantage of the ground-wheel drive is that it is inoperative when the spreader is standing still; or it is inoperative for all practical purposes when the spreader is moving at a speed only slightly above zero.

It is one of the principal objects of the present invention to provide a convertible drive mechanism that can be changed from one type of drive to the other, thus affording the user the combined or multiple advantages of both the power drive and the ground-wheel drive. It is another important object of the invention to achieve a design of convertible drive mechanism that may be readily incorporated in spreaders of existing types, so that the conversion means may be sold as an attachment, as well as an integral part of the basic spreader. The invention features the utilization of a combination pitman and drive link, one of which may be connected to the eccentric or equivalent means on the ground wheel and the other of which may be connected to an available power-driven shaft, such as the proximate end of the beater or discharge device shaft. Further features of the invention reside in the ease with which the conversion mechanism may be changed from one type to the other; the disconnectibility of the linkages and pitman; the releasable means for retaining the disconnected drive link in stored position; and various other features inherent in and encompassed by the invention, all of which will appear as a preferred embodiment of the invention is described in detail in the following specification and accompanying sheets of drawings, the several figures of which will be described immediately below.

Figure 1:
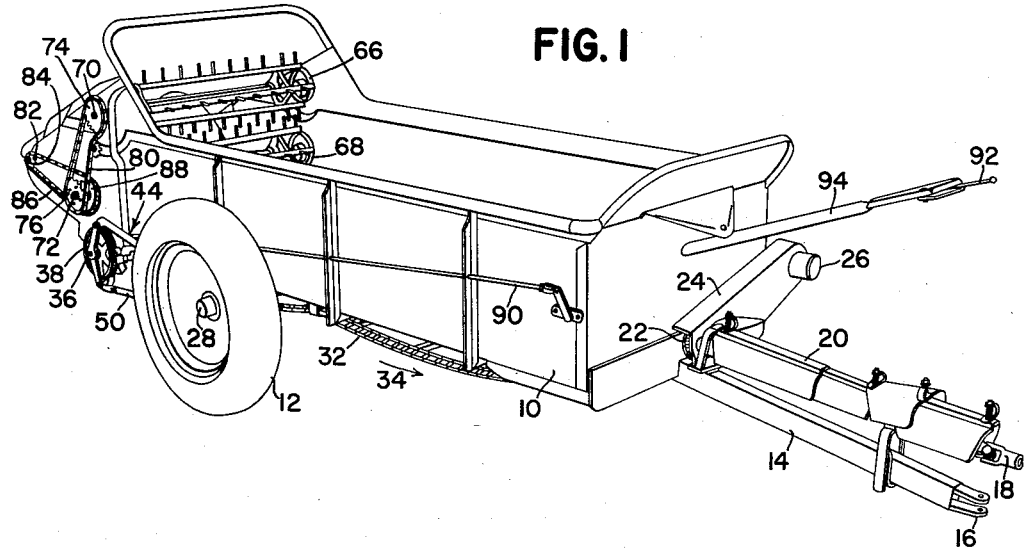
Fig. 1 is a perspective comprehensive view of a representative type of spreader susceptible to equipment with the conversion drive mechanism.
Figure 5:
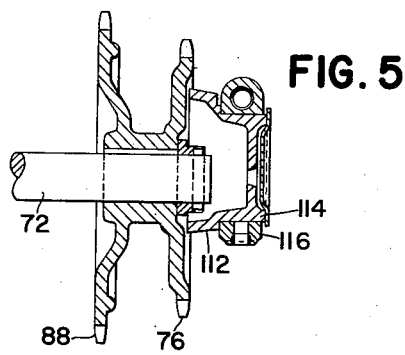
Fig. 5 is an enlarged sectional view as seen along the line 5—5 of Fig. 3.

The spreader chosen for the purposes of illustration may be considered as representative of any conventional type and many of the characteristics thereof are explained here merely for purposes of orientation and not as establishing any limits on the adaptability or utility of the invention. The spreader, as is conventional, includes a longitudinal body 10 carried adjacent its rear end on a pair of laterally spaced drive wheels, only the right-hand one of which appears at 12. A draft tongue 14 projects forwardly from the front end of the body and has thereon a clevis 16 adapted for connection to the drawbar of a tractor or equivalent propelling vehicle (not shown).

Whatever tractor or vehicle is used to draw or propel the spreader will be conventionally equipped with a power take-off shaft, to which the forward end of a propeller shaft 18 on the spreader may be connected. This shaft is enclosed by protective shielding 20 and is connected at its rear end by chain and sprocket means 22 (here enclosed in a second shield 24) to a longitudinally running power-driven shaft, not visible here because of its location along the left-hand side of the body 10. However, the presence of such shaft will be apparent from the location of the cylindrical shield portion 26. To the extent described, the arrangement is generally conventional and is deemed to require no further elaboration.

Also as is conventional, the rear wheel 12 and its companion wheel not shown here are journaled on opposite ends of a transverse axle 28 and keyed to the axle adjacent the right-hand end thereof is an eccentric drive element or cam 30. The spreader wheels may be conventionally equipped with overrunning clutches so that when the spreader operates or is drawn straight ahead, both wheels will contribute to driving of the axle 28 and consequently will contribute to driving of the eccentric 30; yet, on turns, one of the wheels may overrun the other. For these and other background details, reference may be had to the U. S. patent to Neighbour et al., 2,302,879.

In the use of the spreader, the body 10 is filled with manure or other material, the body being open at its rear end for the discharge of this material in increments by unloading or discharge means including an unloading device in the form of an endless conveyor or apron, the lower run of which is visible at 32 in the drawings. This lower run travels in the direction of the arrow 34, which means that the upper run, which travels over the floor of the body 10, moves in a rearward direction.

The rear end of the apron 32 is trained about sprockets (not shown) mounted on a transverse shaft, the outer end of which is visible at 36, and to this shaft 36 is keyed a ratchet wheel 38 that forms part of intermittent or step-by-step drive means. Radial arms 40, serving as reciprocating input members for the ratchet wheel 38, are loose on the shaft 36 and are pivotally connected at 42 at their free ends to upper pitman means, designated generally by the numeral 44. Second radial arms, only one of which is visible at 46, extend downwardly from and are loose on the shaft 36, having their free or outer ends pivotally connected at 48 to the rear end of a forwardly extending pitman 50. The pivotal connections at 42 and 48 respectively include mountings for driving pawls 52 and 54. A holding pawl 56 is conventionally mounted on the body by means of a short shaft 58.

The eccentric 30 has appropriately mounted thereon for rotation relative thereto a ring 30a incorporating a bracket 30b that is connected at 60 and 62 respectively to the pitman means 44 and lower pitman 50. Ignoring for the moment the special construction of the pitman means 44 and assuming temporarily, at least, that it is a rigid pitman, it will be seen that rotation of the axle 28 by means of the ground wheels 12 causes oscillation of the eccentric ring 30a and thus effects reciprocation of the pitman means 44 and lower pitman 50. As this reciprocation occurs, the driving pawls 52 and 54 successively and intermittently rotate the ratchet wheel 38 in the direction of the arrow 64. Since the ratchet wheel 38 and apron 32 are driven by the shaft 36, the apron will be caused to travel in an unloading direction. The travel will, of course, be of an intermittent or step-by-step nature.

Fig. 1 shows that the rear portion of the body 10 is equipped with upper and lower discharge devices or beaters 66 and 68 which comprise part of the unloading means that also includes the apron 32. These beaters are mounted respectively on shafts 70 and 72, the outer or right-hand ends of which project from the right-hand side of the body 10 in spaced relation but in proximity to the intermittent drive menas 38—52—54. Keyed respectively to the shafts 70 and 72 at their right-hand ends are upper and lower sprockets 74 and 76 and a chain 80 interconnects these sprockets to establish drive between the lower beater 68 and the upper beater 66, it being understood that the lower beater is power driven from the power-driven shaft that extends along the left-hand side of the body, which shaft, as previously explained, is not shown here, but which is driven by the propeller shaft 18 from power initiating on the tractor or propelling vehicle. Consequently, the ratchet wheel 38 constitutes an input member, the eccentric or ground-wheel-driven main cam 30 is a first output member and the lower beater shaft sprocket 76 is a second output member or means. These three elements or means are in close proximity, with the input means 38 intermediate the two output means 30 and 76.

As a further part of the generally conventional basic spreader structure, the spreader body may include a wide-spread attachment 82 carried on a shaft 84 that is driven by means of a chain 86 from a second sprocket 88 on the lower beater shaft 72. These details are referred to merely to show the versatility of the invention and its adaptability to a spreader that is otherwise conventional. The rate of feed of the ratchet wheel 38 may be adjusted by varying the extent to which the pawls 52 and 54 are engaged with the ratchet wheel, but since this is not an unusual feature a detailed explanation is deemed to be unnecessary; suffice it to say that this adjustment may be accomplished by means including a forwardly extending control rod 90 ultimately under control of a hand lever 92 carried on a support 94 projecting at the front end of the spreader body 10. Again, the details, although forming no part of the present invention, are significant from the standpoint of illustrating the utilization of basic parts of the spreader in the achievement of the many advantages that flow from the use of the invention.

Since the lower beater shaft sprocket 76 is constantly driven by the propeller shaft means previously described, its characteristic as to rate and direction of rotation will be uniform (assuming that the speed thereof is not adjusted or discontinued for some reason). The characteristic of the cam means 30, while mainly one of rotation, imparts oscillating movement to the ring 30a, which ultimately results in reciprocation of the pitman means 44 and lower pitman 50. With the pitman means 44 rigidified and no association had with the sprocket 76 on the lower beater shaft 72, the structure is fundamentally customary and the results that will be accomplished are not materially different from those that obtain in any material spreader. However, when the invention is utilized, either as an attachment or as basic equipment furnished with the spreader, several distinct advantages are realized.

Figure 7:
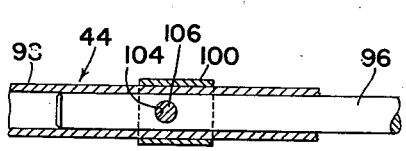
Fig. 7 is an enlarged sectional view as seen along the line 7—7 of Fig. 3.

The pitman means 44 comprises first and second parts 96 and 98, arranged to mutually support each other, which result is achieved by a telescopic connection afforded by the tubular nature of the second pitman part 98. The mutual support of the pitman parts 96 and 98 occurs intermediate the ends of the pitman means 44, the rear end of the pitman part 98 being pivotally connected at 42, as previously described, to the ratchet wheel arms 40 and the forward end of the pitman part or rod 96 being connected at 60, as previously described, to the eccentric ring bracket 30b. The forward end of the pitman part 98 is reenforced by a tube 100 which, for all practical purposes, may be considered an integral part of the tube 98. This portion of the tube 98 is apertured in diametrical alinement, as at 102, and the rearward or received end of the pitman part 96 is diametrically apertured at 104. When the pitman parts achieve a certain relationship between each other, as respects their over-all effective length, the apertures 102 and 104 are in register and are therefore adapted to receive a lock element in the form of a pin 106, which pin is shown in place in Figs. 3 and 4. With the pin in place, the elements 102, 104, 106 and the associated portion of the pitman parts comprise a locked pitman-carried device (Fig. 7) and the pitman parts become rigidified and the pitman means 44 may be considered a solid driving link between the output means 30—30a and the input means 38—52—54. When the pin 106 is removed, the pitman parts 96 and 98 are free to slide relative to each other, because they are telescopic and therefore mutually supported, enabling operating of the part 96 as a reciprocating first output member driven by the cam 30 as long as the wheel 12 rotates forwardly. The respective lengths of the parts are such that they do not become separated during relative movement. The pitman means 44 is thus disconnectible and when so disconnected the drive to the ratchet wheel 38 from the main cam 30 will be such that although the forward pitman part and the lower pitman 50 are still driven by the main cam, the rear pitman part 98 is idle. Retention of the effectiveness of the lower pitman 50 has little if any effect on power driving of the ratchet wheel 38 from the lower beater shaft sprocket 76 as will be presently described, since the power drive overruns the pawl 54.

Figure 4:
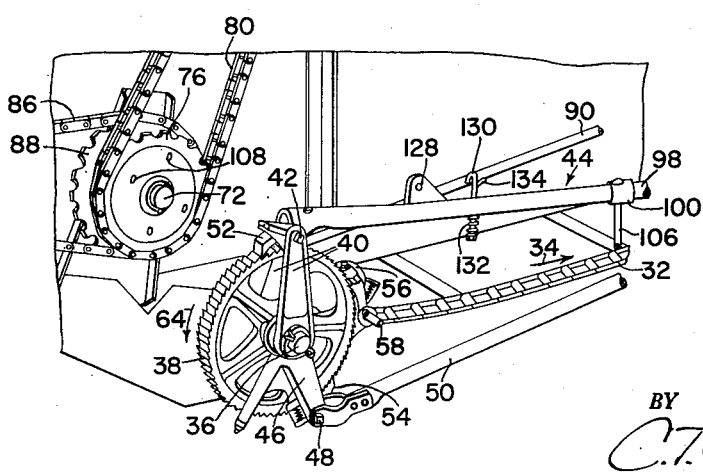
Fig. 4 is a similar view showing the power drive linkage completely removed.

As best seen in Fig. 4, the sprocket 76 has a plurality of apertures 108 therein for receiving a plurality of cap screws 110 by means of which the sprocket is augmented by an output member 112 furnished with an eccentric or secondary cam 114. A cam ring 116 encircles and is driven in an oscillating motion by the secondary cam 114 to afford a reciprocating second output member, usable alternatively, as will presently appear, with the previously described reciprocating first output member 96. This cam ring has an integral portion 118 apertured at 120 to receive a lock element, which lock element is here the pin 106 previously described as a connecting means between the pitman parts 96 and 98. In other words, the locking means or pin 106 is interchangeable between the registered apertures 102 and 104 of the pitman parts and the aperture or bore 120 in the secondary cam ring portion 118. When in the latter position the ring 116 is held against rotation thereby affording a reciprocating motion to the output member or ring 116 and particularly the portion 118.

Figure 2:
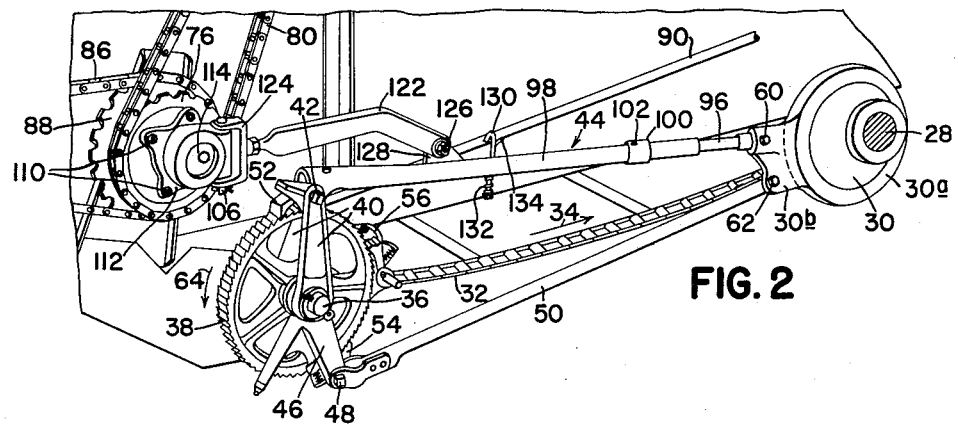
Fig. 2 is a fragmentary perspective view, on an enlarged scale, showing the utilization of the conversion drive mechanism in establishing drive between the unloading device or apron and a power-driven shaft.

Receipt of the pin 106 by the bore 120 in the secondary cam eccentric ring portion 118 is incident to connection to the secondary cam of a drive link 122 having its rear end in the form of a yoke 124, the opposite legs or ears of which are arranged to embrace the portion 118 and which are apertured to receive the pin 106. The opposite end of the link carries a securing means in the form of a bolt 126 which passes through an apertured lug 128 rigid on the rear pitman part 98. Thus, oscillating motion of the ring 116 will result in reciprocating motion of the pitman part 98. Fig. 2 shows the connection of the driving link between the secondary cam 114 and the pitman part 98. Since the locking pin 106 is utilized in the connection between 118 and 124, it is absent from the previously occupied position between the pitman parts 96 and 98. Consequently, the pitman parts 96 and 98 are free to incur relative telescopic movement and the pitman part 98, instead of being driven by the pitman part 96, will be driven by the drive link 122 from the secondary cam 114 and will actuate the pawl 52 via the arms 40. The user may thus, as previously pointed out, take advantage of those occasions when power drive is preferable to ground drive. In short, he has a choice of output means, one being the secondary cam 114 and the other being the main cam 30, either being selectively connectible to the reciprocable element made up of the link 122 and the pitman part 98. In either case, the rate of feed of the apron 32 via the ratchet wheel 38 is adjustable by the rod 90 and lever 92. The cases in which the power drive is more desirable are those in which drive from the ground wheel 12 is either ineffective or inefficient. For example, if the user desires to unload the spreader while the machine is standing still, obviously the ground drive will be ineffective. Therefore, the power drive becomes an important adjunct to the over-all operating efficiency of the machine. If, during operation of the spreader in the field, slippery ground conditions are encountered, which will seriously interfere with the traction obtained by the wheels 12, the feed to the apron 32 will be seriously affected. In such cases, the user has merely to connect his power drive and the disadvantages are eliminated.

Figure 6:
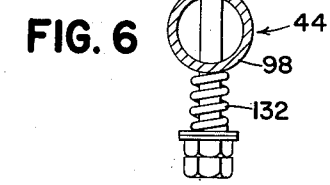
Fig. 6 is an enlarged transverse sectional view as seen along the line 6—6 of Fig. 3.
Figure 3:
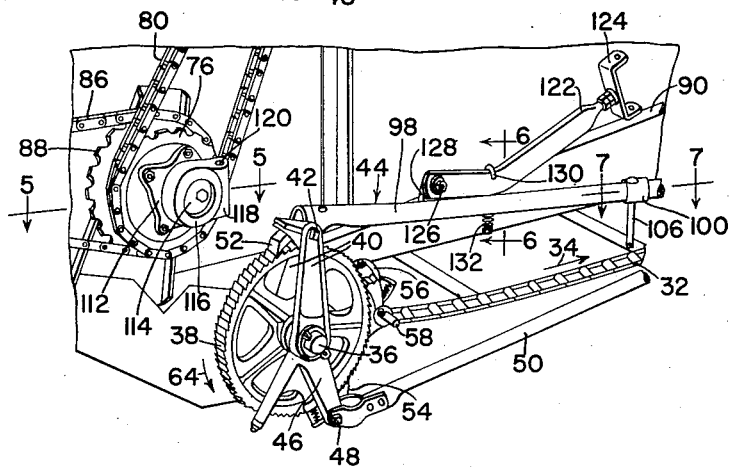
Fig. 3 is a similar view but shows the power drive disconnected and the unloading device driven by the ground wheel, with the power drive linkage in stored position.

Another feature contributing to the versatility of the drive means illustrated is the arrangement whereby the drive link 122 may be folded back or out of the way. This folded position of the drive link is shown in Fig. 3, wherein it will be seen that the locking element or pin 106 has been removed from the secondary cam and has been replaced as a connection means between the pitman parts 96 and 98, thus rigidifying the pitman means 44. The drive link in its folded position is retained by releasable means shown best in Fig. 6 and comprising a locking hook 130 passing loosely and diametrically through the tubular pitman part 98 and spring-loaded by a light compression spring 132. A lifting handle 134 is furnished on the hook for ease of operation. When the link is folded, the hook 130 merely hooks over the drive link 122 and holds it in position against the pitman means 44.

Because there are many operators of spreaders who feel that the rate of feed of the apron or unloading means 32 is more uniform when the apron is ground driven, the drive means afforded by the invention enables the user to disconnect the power means at will and to utilize the ground drive, in which case the parts will appear as in Fig. 3. Fig. 4 represents a spreader construction that may be furnished without the conversion drive means but which is adapted to accommodate the conversion when the conversion unit is later purchased as an attachment.

Various other features in addition to those specifically enumerated herein will undoubtedly occur to those versed in the art, as likewise will numerous modifications and alterations in the preferred embodiment of the invention, all of which may be achieved without departing from the spirit and scope of the invention.

What is claimed is:

1. In a ground-wheel-supported and power-means-driven material spreader having a body, unloading means in the body including one part connected to intermittent drive means and a second part connected to a rotary member driven by the power means, and a ground-wheel-driven main cam, the improvement residing in dual drive mechanism for driving the intermittent means selectively from either the main cam or the rotary member, comprising: pitman means having opposite ends respectively proximate to the main cam and intermittent means and including first and second separate pitman parts respectively connected to said main cam and said intermittent means and mutually supporting each other intermediate said ends of the pitman means, and a pitman-carried device selectively lockable to connect the pitman parts for movement in unison and releasable to disconnect said parts for relative movement; a secondary cam connected to and driven by the rotary member; a drive link between and having opposite ends respectively proximate to the secondary cam and second pitman part; and first and second link-connecting means respectively connecting the ends of the link to the secondary cam and to the second pitman part, one of said link-connecting means being connectible to drive the second pitman part from the secondary cam while the pitman-carried device is released and said one link-connecting means being selectively disconnectible when the pitman-carried device is locked.

2. In a ground-wheel-supported and power-means-driven material spreader having a body, unloading means in the body including one part connected to intermittent drive means and a second part connected to a rotary member driven by the power means, and a ground-wheel-driven main cam, the improvement residing in dual drive mechanism for driving the intermittent means selectively from either the main cam or the rotary member, comprising: pitman means having opposite ends respectively proximate to the main cam and intermittent means and including first and second separate pitman parts respectively connected to said main cam and said intermittent means and mutually supporting each other intermediate said ends of the pitman means, and a pitman-carried device selectively lockable to connect the pitman parts for movement in unison and releasable to disconnect said parts for relative movement; a secondary cam connected to and driven by the rotary member; a drive link having at one end thereof a first force-transmitting connection to the second pitman part and at its other end a second force-transmitting connection to the secondary cam; said second connection being releasable when the pitman-carried device is locked; and said first connection including a pivot enabling folding of the drive link relative to the pitman means following release of said second connection.

3. The invention defined in claim 2, including: retaining means carried by the pitman means and engageable with the folded drive link to support said link during driving of the intermittent means by the main cam and pitman means.

4. In a ground-wheel-supported and power-means-driven material spreader having a body, unloading means in the body including one part connected to intermittent drive means and a second part connected to a rotary member driven by the power means, and a ground-wheel-driven main cam, the improvement residing in dual drive mechanism for driving the intermittent means selectively from either the main cam or the rotary member, comprising: pitman means having opposite ends respectively proximate to the main cam and intermittent means and including first and second separate pitman parts connected at opposite ends of the pitman means respectively to the main cam and to the intermittent means for relative movement at times, said parts having cooperative mutually adjacent portions intermediate said ends of the pitman means and each of said portions having a lock-receiving aperture, said apertures being registrable incident to interconnection of said parts for movement in unison; a secondary cam connected to and driven by the rotary member and having a lock-receiving aperture therein; a drive link extending between the second pitman means part and the secondary cam and having a first end connected to the second pitman means part and a second end having a lock-receiving aperture registrable with the lock-receiving aperture in the secondary cam; and a lock element selectively receivable by the registered apertures in the pitman means parts to interconnect the pitman parts for driving of the intermittent means from the main cam via the pitman means, and said lock element being alternatively receivable in the registered apertures of the secondary cam and second end of the drive link to interconnect the secondary cam and drive link for driving of the intermittent means from the rotary member via the drive link and the second pitman means part.

5. The invention defined in claim 4, including: cooperative means on the pitman parts to slidably support said parts mutually on each other during relative movement thereof in the absence of receipt of the lock element by the apertures in said pitman means parts.

6. In a material spreader having a body supported on ground wheels and propelled by a vehicle having a power source, said body including unloading means and an intermittent drive means connected to the unloading means, said drive means having a reciprocating input member, the improvement residing in dual drive mechanism for driving the input member selectively and optionally from either the ground wheels or the power source, comprising: a reciprocating first output member on the body and driven by the ground wheels; a reciprocating second output member on the body and driven by the power source, said input member and said output members being located at the same side of the body and in such spaced relation that the input member lies intermediate the output members; a reciprocable drive element connected to the input member and extending in opposite directions therefrom to have opposite first and second end portions respectively proximate to the first and second output members; and means interchangeable between said end portions and respectively cooperative between said end portions and the output members for connecting the first end portion exclusively to the first output member or for optionally connecting the second end portion exclusively to the second output member.

7. The invention defined in claim 6, in which: the first end portion of the drive element and the first output member are telescopically arranged as respects each other for effecting mutual slidable support of one on the other in the absence of connection thereof by said interchangeable means.

8. The invention defined in claim 6, in which: the drive element comprises a pitman part extending from the input member toward the first output member to establish said first end portion, and a link having a pivot connection to the pitman part and extending in the opposite direction to establish said second end portion, and said link is optionally foldable relative to the pitman part about said pivot to extend in the same direction as the pitman part.

9. The invention defined in claim 8, in which: the pitman part has releasable means thereon engageable with and for supporting the link in folded position.

10. In a material spreader having a body supported on ground wheels and propelled by a vehicle having a power source, said body including unloading means and an intermittent drive means connected to the unloading means, said drive means having a reciprocating input member, the improvement residing in dual drive mechanism for driving the input member selectively and optionally from either the ground wheels or the power source, comprising: a reciprocating first output member on the body and driven by the ground wheels; a reciprocating second output member on the body and driven by the power source, a reciprocable drive element connected to the input member and having first and second portions respectively proximate to the first and second output members; and means interchangeable between said portions and respectively cooperative between said portions and the output members for connecting the first portion exclusively to the first output member or for optionally connecting the second portion exclusively to the second output member.

11. In a material spreader having a body supported on ground wheels and propelled by a vehicle having a power source, said body including unloading means and an intermittent drive means connected to the unloading means, said drive means having a reciprocating input member, the improvement residing in dual drive mechanism for driving the input member selectively and optionally from either the ground wheels or the power source, comprising: a first output member on the body and driven by the ground wheels, a second output member on the body and driven by the power source; a drive element connected to the input member and having first and second portions respectively proximate to the first and second output members; and means interchangeable between said portions and respectively cooperative between said portions and the output members for connecting the first portion exclusively to the first output member or for optionally connecting the second portion exclusively to the second output member.

References Cited in the file of this patent

UNITED STATES PATENTS

| | | |
|---|---|---|
| 1,376,467 | Simmon | May 3, 1921 |
| 1,963,478 | Swanson et al. | June 19, 1934 |
| 2,219,662 | Schulze | Oct. 29, 1940 |
| 2,256,815 | Raney et al. | Sept. 23, 1941 |
| 2,302,879 | Neighbour et al. | Nov. 24, 1942 |
| 2,407,104 | Schmied | Sept. 3, 1946 |
| 2,489,594 | Sherman | Nov. 29, 1949 |
| 2,645,500 | Moss | July 14, 1953 |
| 2,659,608 | Topp | Nov. 17, 1953 |